United States Patent Office 3,652,743
Patented Mar. 28, 1972

3,652,743
PREPARATION OF HYDROXYALKYL PHOS-
PHATES AND POLYPHOSPHATES
Guy H. Harris, Concord, Robert S. Olson, Lafayette, and
Robert D. Wilcox, Palo Alto, Calif., assignors to The
Dow Chemical Company, Midland, Mich.
No Drawing. Filed Mar. 26, 1968, Ser. No. 715,992
Int. Cl. C07f 9/08, 9/12
U.S. Cl. 260—982
9 Claims

ABSTRACT OF THE DISCLOSURE

A process is disclosed for the preparation of hydroxyalkyl phosphates. Cyclic bis-alkylene pyrophosphates are converted to hydroxyalkyl phosphate and polyphosphate compounds having the formula

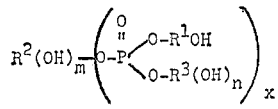

wherein $R^1$ represents a divalent vicinal alkylene radical, $R^2$ represents a hydrocarbyl radical which may be substituted or unsubstituted, $R^3$ represents hydrogen or a radical of the $R^2$ type, $m$ and $n$ are integers having a value of from 0 to 7 each, and $x$ is an integer having a value of from 1 to 8.

---

In carrying out the process, cyclic bis-alkylene pyrophosphates are subjected to hydrolysis or alcoholysis to cleave the P—O—P bond and form cyclic alkylene phosphate intermediates. The cyclic alkylene hydrogen phosphates so formed can be reacted with an alcohol to open the ring and form β-hydroxyalkyl hydrocarbyl hydrogen phosphates, while any cyclic alkylene hydrocarbyl phosphates formed can be reacted with water or an alcohol to similarly open the ring and form β-hydroxyalkyl hydrocarbyl hydrogen phosphates, with water, or β-hydroxyalkyl dihydrocarbyl phosphates with an alcohol.

BACKGROUND OF THE INVENTION

It is known to prepare hydroxyalkyl phosphate esters wherein the phosphoric acid is esterified with an alkylene glycol or polyoxyalkylene glycol. These methods, which are discussed in U.S. Pat. No. 3,094,549, usually involve condensation of phosphoric acid with alkylene oxides or the reaction of a phosphorus halide with a glycol or polyoxyalkylene glycol. However, the resultant phosphate ester compounds normally incorporate like hydrocarbyl moieties, and it is an object of the invention to provide a more flexible method which permits the molecule to be tailored so as to incorporate any desired grouping of the same or different hydroxyalkyl and other hydrocarbyl components as the several $R^1$, $R^2$ and $R^3$ radicals.

SUMMARY OF THE INVENTION

This invention relates to a novel process for the preparation of phosphate esters which are generically referred to herein as "hydroxyalkyl phosphates" and have the formula

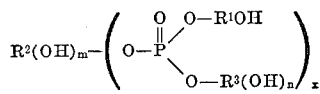

(I)

In the above and other formulas herein, $R^1$ represents a divalent vicinal alkylene radical, i.e., an ethylene or substituted ethylene residue of a vicinal alkylene oxide, wherein the hydroxyl group is carried in the β- position, $R^2$ represents a hydrocarbyl radical which may be substituted or unsubstituted, and $R^3$ represents a hydrogen atom or a radical of the $R^2$ type. Further, $m$ and $n$ are integers each having a value of from 0 to 7, preferably 0 or 1, and $x$ is an integer having a value of 1 to 8, preferably 1.

According to the invention, which proceeds in a series of reaction steps, each controlled to introduce a particular moiety into the ultimate phosphate product, a cyclic bis-alkylene pyrophosphate is first reacted in an inert mutual solvent with either water or a hydroxy-substituted hydrocarbon such as a mono- or polyhydric alcohol. The reactants are employed in equimolar proportions except in the case of a polyol where the alcoholysis reaction may be carried out using from one mole to as little as one equivalent weight thereof for each mole of pyrophosphate. The hydrolysis or alcoholysis reaction which takes place in this first reaction step results in a cleavage of the P—O—P bond in the pyrophosphate and in the resultant formation of cyclic alkylene phosphate intermediates. Exemplary reactions of this step are represented by the following equations wherein Equation 1 represents hydrolysis with water, Equation 2 represents the alcoholysis reactions which take place with monohydric or polyhydric alcohols employed in equimolar proportions with respect to the pyrophosphate, and Equation 3 represents the case where one equivalent weight of polyol is employed per mole of pyrophosphate, thereby forming an intermediate cyclic polyphosphate carrying more than one cyclic alkylene phosphate group on a hydrocarbyl nucleus:

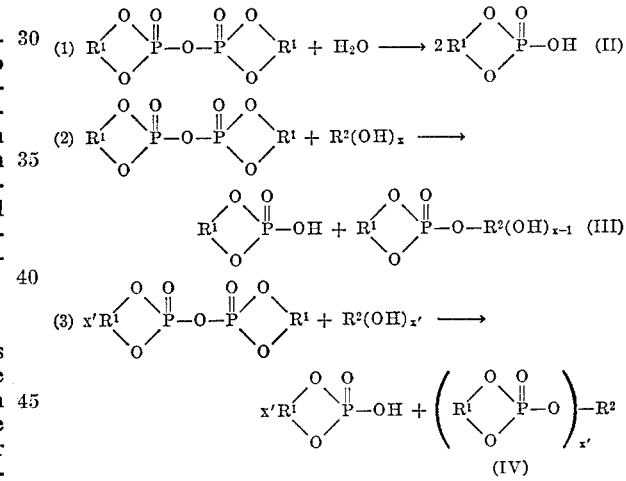

In the above equations, $R^1$, $R^2$ and $x$ are as defined above, and $x'$ is an integer having a value of from 2 to 8. It will be observed that a cyclic alkylene hydrogen phosphate intermediate (Formula II) is formed in all instances. It will also be seen that in alcoholysis reaction (2), where the mono- or polyhydric alcohol is employed in equimolar proportions, as is preferred, there is also formed a cyclic alkylene hydrocarbyl phosphate (Formula III). Equation 3 shows that with a polyhydric alcohol reactant, and employing the same in less than equimolar proportions, down to an equivalent weight of polyol per mole of pyrophosphate, the cyclic intermediate formed is one of the polyphosphate type (Formula IV). The respective intermediate compounds of Formula II, on the one hand, and Formula III or IV on the other, are separated from one another before undergoing the next step in the process. This separation can readily be made because of relatively low solubility of the so-called "ring acid," or Formula II product, as compared with the non-acid ring intermediates.

The reaction with the pyrophosphate takes place readily as the reactants are brought together in an inert organic solvent. Any solvent that dissolves the phosphate reactants and is not detrimentally reactive under the conditions of the process can be used, a liquid preferably being employed which is readily distillable. Suitable solvents include hydrocarbons, such as petroleum ether, benzene or toluene; ethers, such as diethyl and dibutyl ethers and dioxane; ketones, such as acetone or methyl ethyl ketone; halogenated hydrocarbons, such as chloroform, carbon tetrafluoride, chlorobenzene, methylene chloride and trichloroethylene; alkyl nitriles, such as acetonitrile and butyronitrile; and alkyl amides such as dimethylformamide. The amount of solvent employed is not critical and good results can be had by using from ½ to 5 or more liters per mole of pyrophosphate.

The hydrolysis or alcoholysis of the pyrophosphate proceeds at temperatures of from about 0° C. to 100° C., or to the boiling point of the solvent. However, the reaction proceeds readily at lower temperatures such as 0° C. to 40° C., and the use of temperatures in this range is preferred since higher temperatures may promote undesirable side reactions. The reaction time is not critical, and under optimum temperature conditions the reaction is essentially complete as soon as all the water or hydroxyl compound has been added, or within a period of one or a few hours thereafter. Infrared analysis can be employed to determine when this portion of the reaction process is complete, the spectrum then being essentially free of absorption at about 1320–1325 cm.$^{-1}$ which is characteristic of P=O in bis-alkylene pyrophosphates.

In another method, described in co-pending application, Ser. No. 703,542, filed Feb. 7, 1968, the pyrophosphate reactant can be prepared by reacting $P_2O_5$ with 2 moles of a vicinal alkylene oxide reactant ($R^1O$) under anhydrous conditions.

It is possible to employ a wide variety of vicinal alkylene oxides (or of alkane-1,2-diols) in preparing the pyrophosphate starting material, thus providing a great deal of flexibility as regards the $R^1$ moiety of the hydroxyalkyl phosphates prepared by the method of this invention. Representative alkylene oxides include ethylene oxide, propylene oxide, 1,2- or 2,3-butylene oxide, 1,2- or 2,3-octylene oxide, cyclohexene oxide, 2,4,4-trimethyl-2,3-pentene oxide, 1,2-dodecylene oxide, the various 1,2- and other vicinal hexadecylene and octadecylene oxides, butadiene monoxide, epichlorohydrin, epibromohydrin and fluorinated or mixed fluorinated and chlorinated alkylene oxides of the type disclosed, for example, in U.S. Pat. No. 3,366,610. As a practical matter, the preferred reactants are the unsubstituted, open chain, saturated, vicinal alkylene oxides of from 2 to about 20 carbon atoms which are herein designated, for convenience, as "open chain alkylene oxides" of the indicated carbon atom content.

The hydroxy-substituted compound which can be employed in lieu of water to react with pyrophosphate in the first step of the present process, and which can also be employed in the second step thereof to react with the cyclic intermediates such as those of Formulas II, III or IV, can similarly be selected from a wide variety of available organic compounds. Suitable compounds include monohydroxy compounds such as methanol, ethanol, n-butanol, isopropyl alcohol, sec.-butyl alcohol, amyl alcohol, hexanol, octyl alcohol, heptyl alcohol, lauryl alcohol, tetradecyl alcohol, hexadecanol, octadecanol, oleyl alcohol, methallyl alcohol and crotyl alcohol; polyhydroxy compounds such as ethylene glycol, polyethylene glycol, trimethylene glycol, glucose and sucrose; ether alcohols of ethylene and alkylene glycols marketed under trade names such as Dowanols and Cellosolves; aralkyl alcohols such as benzyl and β-phenylethyl alcohol, nitroalcohols such as 2-nitropropanol and 2-nitroethanol; pyridinols; chloropyridinols; acetylenic alcohols such as 2-propargyl alcohol, 2-methyl-3-butynol-2, 3-methyl-1-pentynol-3, 3-butyne-1-ol, 2-butyne-1,4-diol, 2,4-hexadiyne-1,6-diol and 3,6-dimethyl-4-octyne-3,6-diol; and other hydroxy compounds such as dialkylaminoalcohols, 2,4-dichlorophenoxyethanol, 2,4,5 - trichlorophenoxyethanol, 2-(2,4-dichlorophenoxy) propanol, 2 - (2,4,5 - trichlorophenoxy)propanol, phenol, pentachlorophenol, 4,6 - dinitro-2-sec.-amylphenol, 4,6-dinitro-2-sec.-butylphenol, 4,6-dinitro-2-cresol, and mono- and polyhalophenols.

As a second step in carrying out the process of this invention, the cyclic intermediates of the type represented by Formulas III and IV (or by Formula IX, as discussed below), which already incorporate an $R^2$ group, can now be further reacted, separately from the Formula II compound, with at least the stoichiometrically required amount of water or of the mono- or polyhydroxy compound. The required amount for each phosphate ring present in the intermediate is one mole of water or a monohydroxy compound, or one equivalent weight of a polyhydroxy compound, and preferably the alcoholic reactant is employed in large excess. With water on the other hand, it is preferred to use little or no excess over the stoichiometrically required amount. This reaction, using water or a hydroxy compound, is typically illustrated by the following equations:

(4)
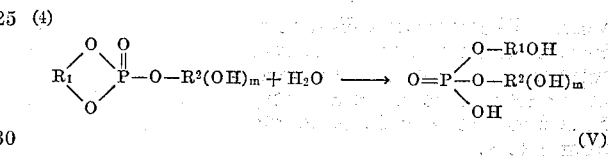
(V)

(5)
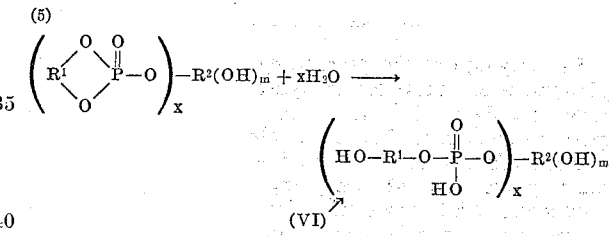
(VI)

(6)
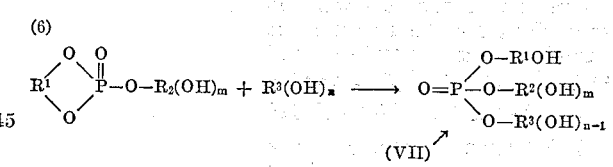
(VII)

(7)
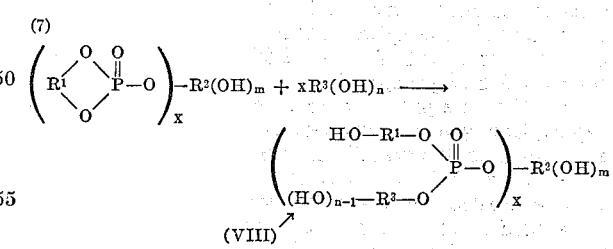
(VIII)

In the above equations, $R^1$, $R^2$ and $R^3$, together with $m$, $n$ and $x$, are as defined above.

When the cyclic phosphate intermediate to be employed in the second reaction step hereof is one of the type which contains an acid hydrogen atom, as represented by Formula II, the ring is opened and an $R^2$ group is introduced by reacting said intermediate with a mono- or polyhydric alcohol or other hydroxy-substituted reactant of the type described above. This reaction requires one mole of a monohydric or polyhydric reactant if the product is to comprise only one phosphate moiety (Reaction 8, below). On the other hand, if a polyphosphate is desired, then as little as one equivalent weight of the polyol can be employed per mole of the ring acid reactant (Reaction 9, below). These ring opening operations are exemplified by the following equations (8)
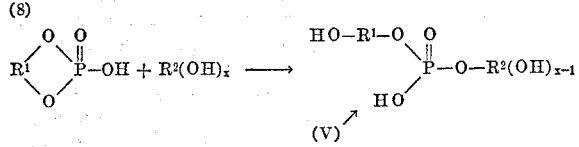

(9)
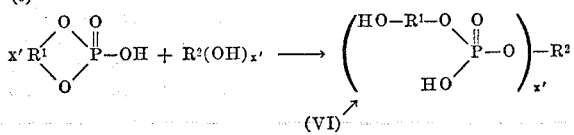

wherein $R^1$, $R^2$, $x$ and $x'$ are as previously identified.

As noted above, the cyclic acid phosphates of Formula II are separated from the non-acid cyclic phosphate intermediates before either is further reacted to open the ring. This separation can be effected in most instances by known fractional crystallization methods in view of the relatively poorer solubility characteristics of the Formula II compounds. For example, chilling the crude reaction mixture, thereby inducing precipitation of the cyclic acid compounds of Formula II, will usually suffice. In some cases this separating step is aided by first distilling off a portion of the solvent before cooling the solution, or by introducing a solvent such as hexane, chloroform or carbon tetrachloride which is known to have little solubility for the cyclic acid intermediates. The added solvent can be used either to supplement or to replace that employed as the reaction medium.

The reaction which takes place in step two hereof between any such cyclic alkylene phosphate intermediate and a hydroxy-substituted reactant other than water can be effected by bringing the materials together under acid conditions in an inert, preferably mutual solvent present in an amount sufficient to dissolve the phosphate. In most preparations the alcohol or other hydroxy reactant is employed in excess to avoid any undesirable polymerization reactions of the (—P—O—$R^1$—O) type, the latter being the predominant reaction when significantly less than one mole of a monohydric alcohol, for example, is provided for each mole of cyclic alkylene phosphate intermediate. Preferably a solution of the phosphate reactant is added to the alcohol. The reaction temperature and duration of the reaction are not critical. While temperatures of from about 10° C. to 100° C. can be employed, temperatures of from about 20° to 60° C. are preferred. The reaction is usually complete in from 5 to 10 minutes to about 24 hours under these preferred temperature conditions, although with some reactants somewhat longer periods are required to allow the mixture to fully react. The resulting hydroxyalkyl phosphate can be recovered as a water-white to yellow liquid or waxy material by distilling off the solvent and any other relatively low boiling materials which may be present.

When the ring of the non-acid, cyclic phosphate intermediate is to be opened by reaction of the compound with an equimolar amount of water in the presence of an inert, preferably mutual solvent, the water is preferably added to the phosphate solution, with stirring, and while a large excess of water can be employed, improved results are obtained by employing the water in approximately stoichiometric proportions. The reaction proceeds well at ambient conditions of temperature and pressure. Temperatures of from about 0° C. up to the boiling temperature of the solvent can be used, although temperatures below about 30° C. are recommended since they tend to minimize side reactions productive of hydroxyalkyl dihydrogen phosphates which may occur at higher temperatures, particularly in the presence of excess and/or undissolved water. The hydrolysis reaction is usually complete in from about 15 minutes to 1 or 2 hours at ambient temperatures, although, as in the corresponding alcoholysis reaction, it may be well to allow the reaction mixture to stand for one or more days to ensure completion. The reaction is complete when the infrared spectrum is substantially free of absorption in the region of 1285–1300 cm.$^{-1}$. The final product is similar to that obtained by reacting the intermediate of Formula II with an alcohol, as discussed above, and it can be recovered by distilling off the solvent and any other low-boiling materials which may be present.

In an alternative reaction, the ring acid intermediate compound of Formula II, instead of being first reacted with an alcohol, is first condensed with an alkylene oxide ($R^1O$) and then reacted either with water or with a mono- or polyhydric alcohol to open the ring and form the desired hydroxyalkyl phosphate, as follows

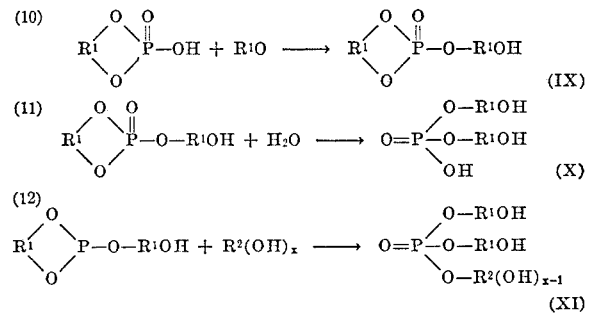

In the above equations, the $R^1$ groups represent the same or different vicinal alkylene radicals, and $R^2$ and $x$ are as identified above.

In reacting the cyclic Formula II compound with a vicinal alkylene oxide, the oxide is preferably incrementally added to the phosphate solution in equimolar proportions, or in excess. The resulting reaction is frequently strongly exothermic and care should be taken to control the temperature, where necessary, by the use of appropriate cooling means. Temperatures of from about 0° C. to 40° C. are preferably employed with the more highly exothermic reaction mixtures, while those from about 40° C. up to the reflux temperature of the solution are employed with the more hindered oxides which give little evidence of a strong reaction at lower temperatures. The reaction is judged to be complete when the acid number of the product falls to a suitably low value or when the infrared spectrum discloses little if any absorption in the region of 1240–1245 cm.$^{-1}$. The final, ring opening step of Equation (11) or (12) is then readily effected by adding water or a mono- or polyol reactant under the conditions described for reacting the intermediates of Formulas III or IV.

The hydroxyalkyl phosphate products prepared as described above in many cases incorporate an acidic hydrogen atom. Treatment of these compounds with a vicinal alkylene oxide in either the presence or absence of a solvent, as taught in U.S. Pat. No. 3,094,549, may reduce the acidity by incorporating a hydroxyalkyl group for each acid hydrogen removed. During such treatment, the alkylene oxide usually also reacts with the hydroxyalkyl groups present, thereby forming ether linkages and moving the hydroxyl group farther out in the chain.

The hydroxy alkyl products obtained herein, whether of the monoacid or completely esterified variety, are generally quite soluble in organic solvents and have low to good solubility in water. They can be recovered as water-white to yellow oils, syrupy liquids or waxy products which find utility in a variety of applications.

DETAILED DESCRIPTION OF THE INVENTION

The practice of the invention is illustrated by the following examples:

EXAMPLE 1

Bis-ethylene pyrophosphate (i.e., the bis cyclic ethylene ester of pyrophosphoric acid) (10 g., 0.0435 mole) was dissolved in 100 ml. dimethylformamide in a reaction flask. To the resulting solution was added an equimolar amount of water (0.78 g.). The solution was then stirred for a few minutes, at ambient conditions of temperature and pressure, following which there was added a large excess (644 g.) of n-butanol. The solution was stirred, stoppered and allowed to stand overnight. The solution was then heated on a rotary evaporator and stripped of its content of solvent and butanol. There remained, as residue, 16.8 g. of a yellow, viscous material, soluble in water and organic solvents, which nuclear magnetic resonance and analysis indicated to be β-hydroxyethyl n-butyl hydrogen phosphate, a Formula V type compound. It was found to have carbon, hydrogen and phosphorus contents of 35.3, 8.1 and 15.9 percent, respectively, as against theoretical values of 35.4, 7.5 and 15.7 percent.

EXAMPLE 2

A solution of the bis cyclic (1-methyl-2-pentylethylene) ester of pyrophosphoric acid in toluene was prepared by slowly adding 2,3-octylene oxide (32 g., 0.25 mole) to a stirred solution of $P_2O_5$ (17.7 g., 0.125 mole) in 200 ml. of solvent in a suitable flask. The flask was cooled during the addition period, which took approximately 45 minutes and was then allowed to stand overnight at room temperatures. The resulting, clear amber solution was then decanted from a small amount of remaining solids, following which there was added 2.25 cc. water (0.125 mole). After being stirred for a few minutes at room temperatures, there was incrementally added 18.5 g. (0.250 mole) of n-butanol as heat was applied to the solution from an infrared lamp. During this period, which took ½ hour, the temperature of the solution was about 45° to 55° C. The solution was then allowed to stand at room temperature for approximately 2 days, after which it was stripped of solvent by heating under high vacuum at 50° to 60° C., leaving 59.6 g. of a yellow, syrupy product, moderately to highly soluble in water and organic solvents, which was indicated by nuclear magnetic resonance to be a mixture of butyl 2-hydroxy-1-methylheptyl hydrogen phosphate and butyl 1-(1-hydroxyethyl)-hexyl hydrogen phosphate. These compounds are of the type represented by Formula V.

In a companion operation, the intermediate cyclic 1-methyl-2-pentylethylene acid phosphate (a Formula II compound) was recovered as a clear, dark brown, viscous oil decomposing at 210–230° C. at 760 mm. Hg. It hydrolyzed in water and had good solubility in organic solvents.

EXAMPLE 3

122 g. (0.53) mole of the bis cyclic ethylene ester of pyrophosphoric acid was dissolved in chloroform to form a 10 percent solution. To this solution was added 83.8 g. (0.53) mole of n-decyl alcohol, following which the mixture was allowed to stand at room temperature for 2 hours. It was then cooled to 12° C. and allowed to stand overnight at this temperature. This caused precipitation of the cyclic ethylene hydrogen phosphate (51.4 g.), which was filtered off. A portion of the chloroform was then removed under vacuum and 1 liter of carbon tetrachloride was added. The solution was again refrigerated overnight, thus inducing further precipitation of the ring acid compound in the amount of approximately 3 g., which was also removed. The carbon tetrachloride was then removed from the intermediate under aspirator vacuum, following which there was added 1 liter of dioxane and 9.5 ml. of water (0.53 mole). The reaction mixture was allowed to stand overnight at room temperature. Infrared analysis disclosed the reaction to be complete, with absorption being present at 1240 cm.$^{-1}$. The dioxane was completely removed on a rotary evaporator, leaving 143.6 g. of a water-white viscous liquid of moderate solubility in water and chloroform, which was identified as decyl 2-hydroxyethyl hydrogen phosphate, a Formula V type product.

EXAMPLE 4

46 g. (0.2 mole) of the bis cyclic ethylene ester of pyrophosphoric acid was dissolved in 120 ml. of dimethylformamide and then added slowly to a solution of sucrose (8.55 g., 0.025 mole) in 90 ml. of the same solvent. The resulting solution was then allowed to stand overnight at room temperatures. The solution was first freed of its content of cyclic ethylene hydrogen phosphate co-product by crystallizing the same out of solution, after which it was heated under vacuum to distill off the solvent. There was recovered, as a cyclic intermediate product, cyclic ethylene phosphate, sucrose octaester, as a yellow, syrupy product having good solubility in water (which rapidly opens the ring to effect hydrolysis). This intermediate product, after being taken up in dimethylformamide was then reacted with 10 ml. water and allowed to stand for several hours at ambient temperatures. The resulting solution was found to contain the hydrolyzed product which can be termed ethylene glycol: hydrogen phosphate, sucrose octaester. It is a Formula VI type product. It is a yellow syrup having good solubility in water and organic solvents.

EXAMPLE 5

To a solution of 0.25 mole of the bis cyclic (1-methyl-2-pentylethylene) ester of pyrophosphoric acid in 400 ml. of toluene was added 4.5 ml. (0.25 mole) of water, the solution being maintained at 0° to 5° C. Infrared analysis made immediately after the water addition, disclosed absorption at 1245 cm.$^{-1}$ characteristic of P=O in the cyclic acid intermediate product, i.e., cyclic 1-methyl-2-pentylethylene acid phosphate. To this solution was incrementally added 64 g. (0.5 mole) of 2,3-octylene oxide, an ice-bath being used to keep the temperature of the solution at 25° C. The reaction was completed by heating the solution at 48° C. for 2.5 hours, using a heat lamp. Infrared analysis shows that absorption at 1240–1245 cm.$^{-1}$ had markedly diminshed. On being freed of solvent by pumping under high vacuum at a maximum of 50° C., there was obtained 164.5 g. of a product that was identified as a mixture of the 2-hydroxy-1-methylheptyl 2,3-octane diol cyclic phosphate and 1-(hydroxyethyl)hexyl 2,3-octane diol cyclic phosphate, these being Formula IX type products. It is a light yellow, syrupy material which hydrolyzes slowly in water and is moderately to highly soluble in water and is moderately to highly soluble in water and organic solvents. Elemental analysis discloses it to have carbon, hydrogen and phosphorus contents of 56.97, 9.75 and 9.34 percent, respectively, as against theoretical values of 51.12, 9.89 and 9.21 percent.

50 grams of the foregoing cyclic ester composition were stirred with 100 ml. of HO at room temperature for 2 days, at which time it was found that complete solution had taken place. When an attempt was then made to remove the excess water under high vacuum, it was found expedient to more or less freeze the solution before applying vacuum because of the sudsy characteristics of the water solution. There was obtained 51.7 g. of a yellow oil product identified as a mixture of bis(2-hydroxy-1-methylheptyl) hydrogen phosphate and bis(1-(1-hydroxyethyl)hexyl) hydrogen phosphate (Formula X products). It has good solubility in water and organic solvents. Elemental analysis discloses carbon, hydrogen and phosphorus contents of 52.4, 10.1 and 10.8 percent, respectively, as against theoretical values of 54.25, 9.95 and 8.74 percent.

EXAMPLE 6

25 g. of n-octyl hydroxyethyl hydrogen phosphate, prepared by the reaction of cyclic ethylene pyrophosphate with water and then with n-octyl alcohol, was placed in a water cooled flask, and to said material was incrementally added 17.2 g. of propylene oxide, this representing 3 moles of the oxide per mole of phosphate. The reaction was strongly exothermic and the ice bath kept the reaction mixture at temperatures below about 21° C. The final product, wherein the hydroxyethyl group was now the hydroxypolyoxyalkylene group,

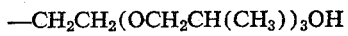

$-CH_2CH_2(OCH_2CH(CH_3))_3OH$ was more fluid than the starting phosphate ester. It also was more soluble in water and gave a sudsy aqueous solution.

EXAMPLE 7

To 0.5 g. mole of bis cyclic 2,3-butylene ester of pyrophosphoric acid in 300 ml. of toluene is incrementally added 0.5 g. mole of isopropanol over a period of 1 hour while stirring at a temperature of 30° C. Approximately half of the toluene is stripped off under reduced pressure and the residuum is chilled in an ice bath and carefully decanted from the resulting precipitate of cyclic 2,3-butylene acid phosphate. The toluene content of the decantate is distilled off under vacuum, leaving an amber oil which is cyclic 2,3-butylene isopropyl phosphate containing a little cyclic 2,3-butylene acid phosphate as an impurity.

The latter residuum is dissolved in acetonitrile and the solution added dropwise in ½ hour to a solution of 0.55 g. mole of benzyl alcohol in the same solvent, while the reaction mixture is held at a temperature of about 60° C. The reaction mixture is held at 50–60° C. for three hours and then stripped of volatile components under high vacuum in a molecular still. These is obtained, as a final product residuum, a waxy light amber colored solid, 2-hydroxy-isobutyl isopropyl benzyl phosphate which is usually obtained in an amount equivalent to more than a 90% yield, based on the bis pyrophosphate starting material. This is a Formula VII type of product.

EXAMPLE 8

½ gram mole of bis cyclic 3-bromo-1,2-propylene ester of pyrophosphoric acid dissolved in $CHCl_3$ is reacted with ½ gram mole of allyl alcohol and the resulting "ring acid" product separated in the manner of the preceding example.

The cyclic ring acid is then added incrementally as a solution in acetone to a several fold excess of heptanol at room temperature. (1-bromomethyl-2-hydroxyethyl) heptyl hydrogen phosphate is recovered in good yield, by stripping off the excess heptanol and acetone, as a light colored oil. This is a Formula V type of product.

To the concentrated chloroform solution of the cyclic 3-bromo-1,2-propylene allyl phosphate is added 0.1 wt. percent of orthophosphoric acid as a catalyst and the solution is added incrementally to 200 ml. of 3-pentanol maintained at a temperature of 65° C., in a period of one hour. The reaction mixture is kept on the steam bath for 4 hours and then stripped of the remaining chloroform and the excess 3-pentanol under high vacuum. The product, (1-bromoethyl-2-hydroxyethyl-) allyl 1-methylbutyl phosphate, is obtained as a waxy yellow-brown solid usually in an amount constituting over an 85 percent yield, based on the bispyrophosphate charged. This is a Formula VII type of product.

The various hydroxyalkyl hydrocarbyl phosphates and di-(hydroxyalkyl)phosphates prepared by the present method have utility in various applications. Thus, they are useful as surface-active agents since they have good detergency and foaming characteristics. They can be employed to good effect in liquid detergent formulations and in tooth paste and other compositions where advantage can be taken of their foaming, detergent and/or solubilizing qualities. In this connection, it should be noted that these compounds have the desirable attribute of being soluble or compatible in systems of high electrolyte content, e.g., solutions of 5–20 percent caustic soda or 2–40 percent tetrapotassium pyrophosphate, while retaining their surface-active properties.

The hydroxyalkyl phosphates are useful for imparting flame resistant qualities to polyurethane foams. Thus, it has been found that when those compounds are incorporated into polyether-isocyanate reaction systems, with the mixture then being conventionally foamed by the one-shot, semiprepolymer or prepolymer technique, the resulting polyurethane foams possess a substantial degree of flame resistance.

The phosphate esters hereof which incorporate more than one hydroxy-substituted group are a particularly useful class of compounds. Thus, they can be used as polyol reactants for polyurethanes. Because of their hydroxyl groups they are excellent for incorporation into urethane systems where they react with the isocyanate groups in the growing polymer chain and thus become fixed. They can be the sole hydroxyl reactant present or they can be used in admixture with other polyhydroxy compounds such as polyethylene glycol having molecular weights of 400 to 3000, polypropylene glycol having molecular weights of 400 to 3000, ethylene glycol, diethylene glycol, triethylene glycol, propylene glycol and dipropylene glycol. Foamed polyurethanes can be obtained by adding water prior to the addition of the isocyanate. The solid polyurethanes obtained have good flame proofing properties and are useful as linings for textiles and insulation in building construction work.

As examples of polyisocyanates which can be employed to make the polyurethane there can be used toluene-2,4-diisocyanate; toluene - 2,6 - diisocyanate; 4-methoxy-1,3-phenylenediisocyanate. Any of the conventional basic catalysts employed in polyurethane foam technology can be used, such as N-methylmorpholine, N-ethylmorpholine or triethylamine. Conventional surfactants can be added such, for example, as polydimethyl siloxane, 50 centistokes grade.

The polyhydroxyalkyl phosphate ester compounds also are useful for incorporation into epoxy resin systems. Thus, they can react directly in an epoxy system, e.g., with dicyclopentadiene diepoxide, catalyzed preferably by an alkyl aminate. They also can be reacted with maleic anhydride or other polybasic acid or anhydride to give the corresponding acid ester phosphate ester which can react in many epoxy systems without additional catalyst. They also can be employed to form polyesters, e.g. by reaction mole for mole with maleic anhydride, phthalic anhydride, dimethyl terephthalate, fumaric acid, succinic acid, oxalic acid, itaconic acid, etc. and are additionally useful as textile softening agents and as surfactants.

Additionally they are useful as lubricants, heat transfer fluids, hydraulic fluids and pump fluids.

We claim:

1. The process comprising reacting by contacting a cyclic bis-alkylene pyrophosphate of the formula

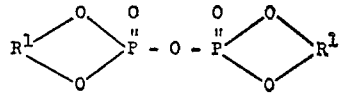

with an alcohol of the formula $R^2(OH)_x$ thus to produce at least one compound having one of the formulas

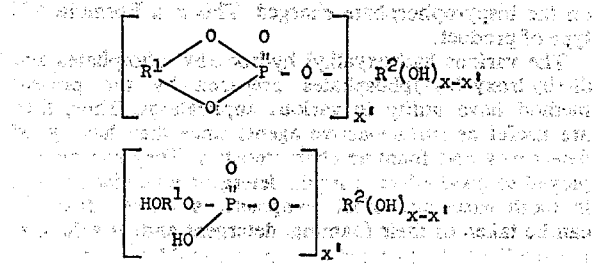

and

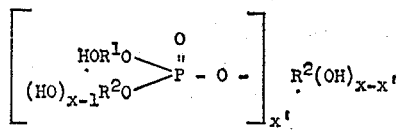

where, in all the above formulas, $R^1$ is a divalent vicinal alkylene radical of 2 to 20 carbon atoms; $R^2$ is the residue formed by the removal of the alcoholic OH groups from an alkanol or alkenol of up to 18 carbon atoms, an alkylene glycol or polyglycol wherein the alkylene moieties each contain 2–3 carbon atoms, the monoether of such glycol or polyglycol, a phenylalkanol wherein the alkyl moiety contains 1 to 2 carbon atoms, an alkynol of up to 6 carbon atoms, an alkynediol of up to 10 carbon atoms, chlorophenoxyalkanol having up to 3 chlorine atoms and having 2 to 3 carbon atoms in the alkyl moiety, phenol, halophenol, or a dinitroalkylphenol wherein the alkyl moiety contains 1 to 5 carbon atoms; and $x$ and $x'$ are integers 1–8, $x'$ being not greater than $x$.

2. A process comprising
subjecting a cyclic bis-alkylene pyrophosphate of the formula

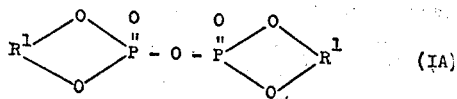 (IA)

to alcoholysis to cleave the P—O—P bond according to the equation

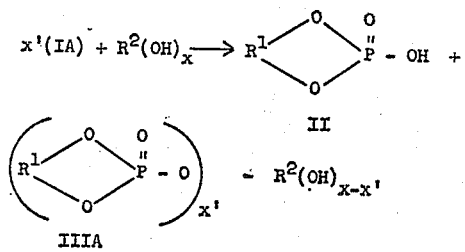

where, in all the above formulas, $R^1$ is a divalent vicinal alkylene radical of 2 to 20 carbon atoms; $R^2$ is the residue formed by the removal of the alcoholic OH groups from an alkanol or alkenol of up to 18 carbon atoms, an alkylene glycol or polyglycol wherein the alkylene moieties each contain 2–3 carbon atoms, the monoether of such glycol or polyglycol, a phenylalkanol wherein the alkyl moiety contains 1 to 2 carbon atoms, an alkynol of up to 6 carbon atoms, an alkynediol of up to 10 carbon atoms, chlorophenoxyalkanol having up to 3 chlorine atoms and having 2 to 3 carbon atoms in the alkyl moiety, phenol, halophenol, or a dinitroalkylphenol wherein the alkyl moiety contains 1 to 5 carbon atoms; $m$ is an integer 0–7 and $n$, $x$ and $x'$ are integers 1–8, $x'$ being not greater than $x$.

3. The process of claim 2 including the additional step of reacting IIIA with an alcohol according to the equation

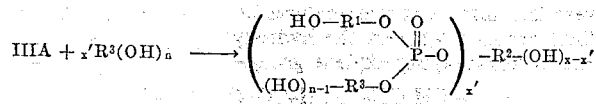

wherein $R^3$ is H or a radical of the class of $R^2$.

4. The process of claim 3 wherein $x$, $x'$ and $n$ are each 1.

5. The process of claim 3 wherein $x$ and $x'$ are 1 and $n$ is 2 to 8.

6. The process of claim 3, $x$ being 2 to 8, $x'$ being greater than 1 but not exceeding $x$, and $n$ being 1.

7. The process of claim 3, $x$ being 2 to 8, $x'$ being greater than 1 but not exceeding $x$, and $n$ being 2 to 8.

8. The process of claim 3 wherein $R^1$ is $-CH_2CH_2-$, $R^2$ and $R^3$ are alkyl of up to 18 carbon atoms, $n$ and $x$ are each 1.

9. The process of claim 3 wherein $R^1$ is $-CH_2CH_2-$, $R^2$ is allyl, $R^3$ is alkyl of up to 18 carbon atoms and $n$ and $x$ are each 1.

References Cited

UNITED STATES PATENTS 3,480,701  11/1969  Kleine-Weischede ____ 260—982

JOSEPH REBOLD, Primary Examiner

R. L. RAYMOND, Assistant Examiner

U.S. Cl. X.R.

252—8.1, 49.8, 78, 135; 260—2 EP, 77.5 AR, 968, 971, 978, 983